(12) United States Patent
Martinez-Molina

(10) Patent No.: US 11,572,122 B2
(45) Date of Patent: Feb. 7, 2023

(54) METHOD AND DEVICE FOR ESTIMATING FORCE

(71) Applicant: INSTITUT POLYTECHNIQUE DE GRENOBLE, Grenoble (FR)

(72) Inventor: John-Jairo Martinez-Molina, Saint Martin d'Heres (FR)

(73) Assignee: INSTITUT POLYTECHNIQUE DE GRENOBLE, Grenoble (FR)

( * ) Notice: Subject to any disclaimer, the term of this patent is extended or adjusted under 35 U.S.C. 154(b) by 1019 days.

(21) Appl. No.: 16/328,059

(22) PCT Filed: Aug. 24, 2017

(86) PCT No.: PCT/FR2017/052269
§ 371 (c)(1),
(2) Date: Feb. 25, 2019

(87) PCT Pub. No.: WO2018/037191
PCT Pub. Date: Mar. 1, 2018

(65) Prior Publication Data
US 2019/0188235 A1   Jun. 20, 2019

(30) Foreign Application Priority Data

Aug. 25, 2016 (FR) .................................... 1657939

(51) Int. Cl.
  *H02P 6/08*       (2016.01)
  *H02P 21/18*      (2016.01)
  (Continued)

(52) U.S. Cl.
  CPC ............. *B62J 45/20* (2020.02); *B62M 6/50* (2013.01); *B62M 6/55* (2013.01); *F03D 7/00* (2013.01);
  (Continued)

(58) Field of Classification Search
  CPC ............................. B60W 10/105; H02P 23/16
  See application file for complete search history.

(56) References Cited

U.S. PATENT DOCUMENTS

| 4,950,966 A * | 8/1990 | Moulds, III | ............ F16F 15/02 267/225 |
| 2014/0327383 A1* | 11/2014 | Turner | ................... G01G 11/04 318/490 |

FOREIGN PATENT DOCUMENTS

| EP | 1466824 A2 | 10/2004 |
| EP | 2143628 A1 | 1/2010 |
| EP | 2658114 A1 | 10/2013 |

OTHER PUBLICATIONS

Blumenthal, J., "Acquisition, Processing, and Analysis of Pedal Motion Data in Bicycliing," MSc. Thesis, Apr. 10, 2009, pp. 1-81, XP055370042, URL:https://www.uni-konstanz.de/mmsp/pubsys/publishedFiles/Blumenthal09.pdf.

(Continued)

*Primary Examiner* — Muhammad S Islam
*Assistant Examiner* — Charles S Laughlin
(74) *Attorney, Agent, or Firm* — Kenealy Vaidya LLP

(57) ABSTRACT

Some embodiments are directed to a method for estimating a periodic or substantially periodic force present in a mechanical or electromechanical system, the method comprising: estimating, by a processing device, one or more harmonic frequencies of an acceleration signal representing an acceleration in the system, the substantially periodic force (Continued)

contributing to said acceleration; and estimating, by the processing device, the force on the basis of a dynamic model of the system, the dynamic model being defined by said one or more estimated harmonic frequencies.

7 Claims, 5 Drawing Sheets

(51) Int. Cl.
<table>
<tr><td>B62J 45/20</td><td>(2020.01)</td></tr>
<tr><td>B62M 6/50</td><td>(2010.01)</td></tr>
<tr><td>B62M 6/55</td><td>(2010.01)</td></tr>
<tr><td>H02P 23/20</td><td>(2016.01)</td></tr>
<tr><td>F03D 7/00</td><td>(2006.01)</td></tr>
<tr><td>G06F 17/10</td><td>(2006.01)</td></tr>
<tr><td>H02P 29/00</td><td>(2016.01)</td></tr>
<tr><td>F03D 7/04</td><td>(2006.01)</td></tr>
<tr><td>G06F 17/11</td><td>(2006.01)</td></tr>
</table>

(52) U.S. Cl.
CPC ............ *F03D 7/045* (2013.01); *G06F 17/10* (2013.01); *G06F 17/11* (2013.01); *H02P 21/18* (2016.02); *H02P 23/20* (2016.02); *H02P 29/00* (2013.01); *H02P 29/0016* (2013.01); *F05B 2260/8211* (2013.01); *Y02E 10/72* (2013.01)

(56) References Cited

OTHER PUBLICATIONS

Petrovic, V., et al., "Experimental validation of wind turbine higher harmonic control using shaft loads measurements," 2013 European Control Conference (ECC), EUCA, Jul. 17, 2017, pp. 472-477, XP032526241.

Soden, P. D., et al., "Forces applied to a bicycle during normal cycling," J. Biomech. 1979;12(7):527-541.

Chen, P.-H., "Application of fuzzy intelligence to Elebike control design," Fuzzy Systems, 1997, Proceedings of the Sixth IEEE International Conference On, Barcelona, Spain, Jul. 1997, vol. 1, pp. 199-206, XP010241908.

Van Der Hooft, E. L., et al., "Wind turbine control algorithms," ECN Literature Review, XX, XX, vol. ECN-C-03-111, Dec. 2003, pp. 1-89, XP003008410.

International Search Report for PCT Patent App No. PCT/FR2017/052269 (dated Nov. 21, 2017) with English translation.

\* cited by examiner

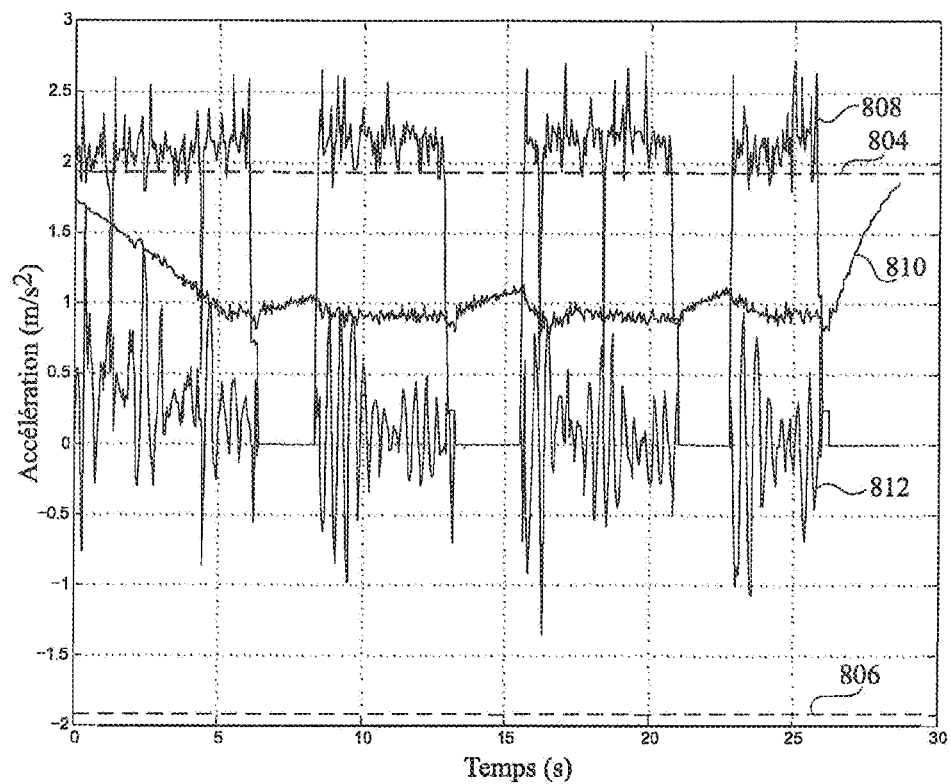
Fig 8B
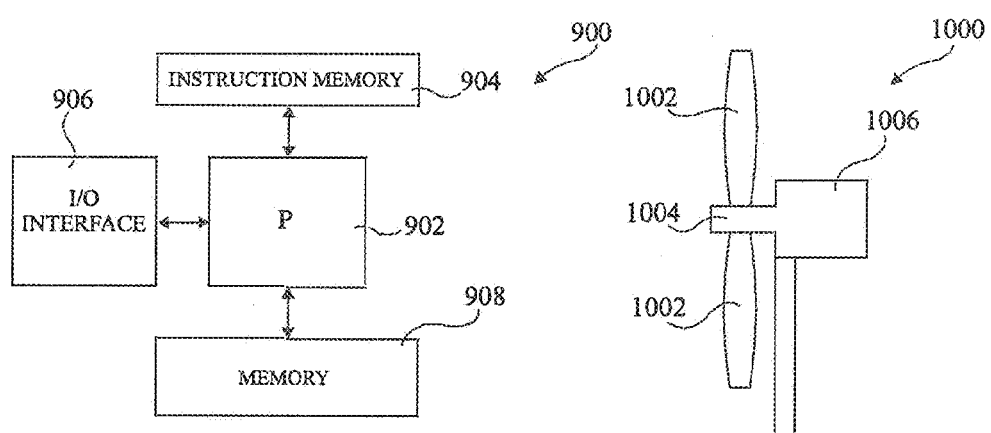
Fig 9
Fig 10

METHOD AND DEVICE FOR ESTIMATING FORCE

CROSS REFERENCE TO RELATED APPLICATION(S)

This application is a national phase filing under 35 C.F.R. § 371 of and claims priority to International Patent Application No. PCT/FR2017/052125, filed on Jul. 21, 2017, claims the priority of French patent application FR 16/57939, which will be considered an integral part of the present description, the contents of which are hereby incorporated in their entireties by reference.

BACKROUND

Some embodiments relate to the field of methods and devices for estimating force and in particular methods and devices for estimating a force in a mechanical or electromechanical system.

In certain fields it is desirable to be able to estimate one or more variable forces influencing a system. For example, in the case of a motor-assisted bicycle, it could be desirable to be able to estimate the force exerted by the cyclist. Similarly, in the case of a wind turbine, it could be desirable to be able to estimate the force generated by wind.

In the case of motor-assisted bicycles, using a torque or power detector to detect the force exerted by each foot of the cyclist has been proposed. Such torque or power detectors are based on the detection of a mechanical deformation, for example the twisting of the shaft in the pedal shaft. Placing force detectors in the pedals of a bicycle has also been proposed. However, one of the drawbacks of these solutions is that their precision is generally affected by temperature variations and by the ageing of the materials used, which means frequent calibration is may be necessary. In addition, such detectors add weight to the structure and are relatively costly to install.

There is therefore a need in this field for a method and a device for estimating forces that solve some or all or most of the drawbacks mentioned above.

SUMMARY

One purpose of the embodiments of the present description is to satisfy one or more of the needs of the related art, at least partially.

According to some embodiments, a method for estimating a periodic or substantially periodic force present in a mechanical or electromechanical system is provided, the method including: estimating one or more harmonic frequencies of an acceleration signal in the system using a processing device, with the substantially periodic force contributing to the acceleration; and, using the processing device, estimating the force based on a dynamic model of the system, the dynamic model being defined by the one or more estimated harmonic frequencies.

According to some embodiments, the dynamic model is updated based on an error signal representing the difference between a sensed speed signal and an estimated speed signal.

According to some embodiments, the method also includes the generation of an acceleration signal based on a differential calculation over time for two or more values of a speed signal representing an angular or linear speed in the system.

According to some embodiments, the estimation of the one or more harmonic frequencies of the acceleration signal involves the calculation of an error signal equal to:

$$e_1(k) = r(k) - \varphi^T \hat{\theta}(k)$$

where r(k) is a current acceleration value and $\varphi^T \hat{\theta}(k)$ is an estimation of the acceleration based on a vector $\hat{\theta}(k)$ representing the harmonic frequencies and a vector $\varphi$ representing one or more previous acceleration values.

According to some embodiments, the mechanical or electromechanical system is a motor-assisted bicycle and the periodic or substantially periodic force is the pedalling force generated by the cyclist, and the dynamic model includes one or more estimations $\hat{v}(k)$, $\hat{\bar{F}}_H(k)$, $\hat{\tilde{F}}_H(k)$ and $\bar{z}(k)$, in which each of these estimations is defined as follows:

$$\hat{v}(k) = \hat{v}(k-1) + \frac{Ts}{M} \cdot F_M(k) + \frac{Ts}{M} \cdot \hat{\bar{F}}(k-1) + \frac{Ts}{M} \cdot \hat{\tilde{F}}_H(k-1)$$

$$\hat{\bar{F}}(k) = \hat{\bar{F}}(k-1)$$

$$\hat{\tilde{F}}_H(k) = \hat{z}(k-1)$$

$$\hat{z}(k) = -\hat{\theta}_2(k) \cdot \hat{\bar{F}}(k-1) - \hat{\theta}_1(k) \cdot \hat{z}(k-1)$$

where Ts is the sampling period, M is the mass of the cyclist and the bicycle, $F_M$ is the force generated by the motor, $\hat{\theta}_1(k)$ and $\hat{\theta}_2(k)$ represent one of the harmonic frequencies, $\tilde{F}_H(k-1)$ is the estimation of the force exerted by the cyclist, and $\tilde{H}(k-1)$ is an estimation of other forces in the system.

According to some embodiments, the mechanical or electromechanical system is a wind turbine and the periodic or substantially periodic force is a periodic component of the force of the wind on the blades of the turbine, and the dynamic model includes one or more estimations $\hat{\omega}_T(k)$, $\tilde{F}(k)$ and $\hat{z}(k)$ in which each of these estimations is defined as follows:

$$\hat{\omega}_T(k) = \hat{\omega}_T(k-1) - \left(\frac{Ts}{I}\right)\tau_{generator}(k) + \left(\frac{Ts}{I}\right)\left(\hat{\bar{\tau}}_{wind} + \hat{\tilde{\tau}}_{wind}\right)$$

$$\hat{\bar{F}}(k) = \hat{\bar{F}}(k-1)$$

$$\hat{\tilde{F}}_H(k) = \hat{z}(k-1)$$

$$\hat{z}(k) = -\hat{\theta}_2(k) \cdot \hat{\bar{F}}(k-1) - \hat{\theta}_1(k) \cdot \hat{z}(k-1)$$

where Ts is the sampling period, $\hat{\theta}_1(k)$ and $\hat{\theta}_2(k)$ represent one of the harmonic frequencies, $\tilde{F}_H(k-1)$ is the estimation of the force exerted by the wind, and $\tilde{F}(k-1)$ is an estimation of other forces in the system, where $\omega_T$ is the speed of the turbine and $\hat{\omega}_T(k)$ is an estimation of the speed of the turbine, I is the inertia of the turbine, $I_{generator}$ is the torque applied by the generator, for example equal to $Ke \cdot I_{generator}$, where Ke is the speed constant of the motor and $I_{generator}$ is the current generated by the generator, and $\hat{\bar{\tau}}_{wind} + \hat{\tilde{\tau}}_{wind}$ represents the total torque generated by the wind, $\tilde{\tau}_{wind}$ representing a cyclical component of this torque.

According to some embodiments, the one or more harmonic frequencies include at least one from among the fundamental frequency, the first harmonic frequency, the second harmonic frequency, and the third harmonic frequency.

According to some other embodiments, a processing device configured to estimate a periodic or substantially periodic force present in a mechanical or electromechanical system is provided, the processing device being configured to: estimate one or more harmonic frequencies of an acceleration signal representing an acceleration in the system, with the substantially periodic force contributing to the acceleration; and estimating the force based on a dynamic model of the system, the dynamic model being defined by the one or more estimated harmonic frequencies.

BRIEF DESCRIPTION OF THE FIGURES

The subject matter and advantages mentioned above, in addition to others, will become clear from the following detailed description of embodiments given for non-limiting, illustration purposes in reference to the enclosed Figures in which:

FIG. 8B is a graph illustrating an acceleration signal and a dynamic constraint according to an embodiment example;

FIG. 9 is a schematic illustration of a computer device according to an embodiment example; and FIG. 10 illustrates a wind turbine according to an embodiment example.

DETAILED DESCRIPTION OF EXEMPLARY EMBODIMENTS

The embodiments described here refer to a method and a device intended for estimating a periodic or substantially periodic force in a mechanical or electromechanical system. The term "periodic force" is used here to refer to a force which is cyclical in nature, at least within certain limits. For example, the force exerted by a cyclist on the pedals of a bicycle is periodic because the force will generally come from the downward thrust applied by the cyclist's foot when each pedal reaches a certain angular position range in its cycle of rotation. There are other mechanical or electromechanical systems in which a periodic or substantially periodic force is present and may be estimated by the techniques described herein. For example, the present inventor has discovered that the force exerted by wind on the blades of a wind turbine generally has a periodic or substantially periodic component which can be estimated, as will be described in greater detail below. One of ordinary skill in the art will be aware of other application in which a periodic or substantially periodic force could be estimated using the techniques described herein, such as for example the force exerted on an oar by a rower or by waves on a boat.

Figure 1:
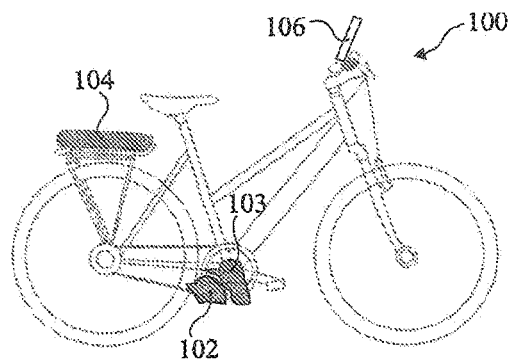
FIG. 1 shows a motor-assisted bicycle according to an embodiment example of the present description.

FIG. 1 shows a motor-assisted bicycle 100 according to an embodiment example. Bicycle 100 includes, for example, an electric motor 102. In the example of FIG. 1, motor 102 is, for example, a roller motor pressing against a tire and installed in the vicinity of pedal set shaft 103, so that the motor applies force directly to the rear wheel tire. In some other embodiments, motor 102 could apply force to pedal set shaft 103, or it could be installed elsewhere, such as on the hub of the front or rear wheel. Motor 102 is, for example, an electric motor powered by a battery 104, which is installed, for example, on a rack placed above the rear wheel of the bicycle. In some other embodiments, battery 104 could be installed elsewhere on the bicycle. The motor, for example, is controlled by a computer 106, which is installed, for example, on the handlebars of the bicycle, although, in this case as well, it could be installed elsewhere. Computer 106, for example, allows the cyclist to select the level of assistance provided by the motor.

Computer 106 is designed, for example, to estimate the useful force exerted by the cyclist. For instance, the useful force is the force that results in an acceleration of the bicycle, and, for example, does not include certain components of the force that are lost to due to friction, etc. The useful force will generally correspond to the torque applied to pedal set shaft 103 by the pedal cranks. In certain embodiments, computer 106 includes a display and is designed to display an indication of the estimated force.

In addition to, or in its place, computer 106 is designed, for example, to control motor 102 based on the estimated force. For example, the level of assistance provided by motor 102 is controlled in such a way that the overall acceleration of the bicycle stays relatively constant, for instance within a range of 10% of the average value. In other words, the motor is controlled, for example, in such a way as to provide greater assistance between the cyclist's pedal strokes. As a variation, computer 106 can be designed to control motor 102 in a different way based on the estimated force, for example in order to provide a level of assistance that is proportional or inversely proportional to the estimated force.

Figure 2:
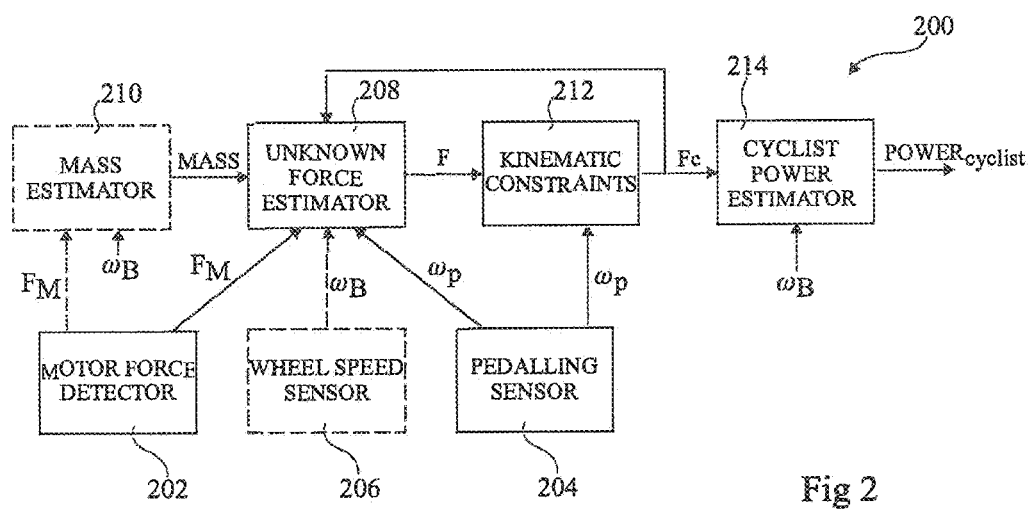
FIG. 2 shows a schematic diagram of a force estimation system according to an embodiment example.

FIG. 2 shows a schematic illustration of a force estimation system 200 according to an embodiment example. For instance, system 200 is partly implemented by computer 106 and partly implemented by detectors and sensors, which will be described in greater detail below.

System 200 includes, for example, a motor force detector 202 which, for instance, provides signal $F_M$ indicating the force applied by the motor at a given instant. System 200 also includes, for example, a pedalling sensor 204, which provides a signal $\omega_P$ indicating the angular velocity of the pedal cranks. This signal can be used, for example, to determine speed $\omega_B$ of the bicycle. In addition to or in place of the pedalling sensor, a wheel speed sensor 206 is, for instance, provided and generated a signal $\omega_B$ indicating the speed of the bicycle. In some other embodiments, signal $\omega_B$ indicating the speed of the bicycle could be provided directly by the motor, in which case the wheel speed sensor could be omitted. Signal $\omega_B$ can include or can consist of, for example, of digital samples and includes at least five samples for each complete rotation of a pedal crank, and possibly at least seven samples for each complete rotation of a pedal crank.

The system of 200 furthermore includes an unknown force estimator 208, implemented for example by computer 106 and designed to estimate an unknown force F in the system, the force corresponding to the useful force exerted by the cyclist. Estimator 208 receives, for example, signal $F_M$ and an indication of the ground of the bicycle and of the cyclist. In certain embodiments, the mass is provided by a mass estimator 210 which, for example, receives the motor force $F_M$ from motor force detector 202 and also the speed of the bicycle $\omega_B$, and estimates the mass based on these parameters while the cyclist is not pedalling. As a variant, the mass can be obtained by an information input provided by the user.

In certain embodiments, the unknown force estimator also receives a pedal speed signal $\omega_P$ from pedalling sensor 204 and/or a bicycle speed signal $\omega_B$ from a wheel speed sensor. Estimator 208 also receives, for example, a cyclist constraint force $F_C$ coming from a previous force calculation, which is used as a basis for calculating a subsequent force value during a subsequent iteration, as described in greater detail below.

Unknown force estimator 208 provides, for example, an estimation F of the useful force generated by the cyclist in the system, a force which contributes to the acceleration $\omega_B$ of the bicycle. A kinematic constraint generator 212 receives, for example, estimated forces F and the pedalling speed $\omega_P$, and generates a cyclist constraint force $F_C$, which is provided through a feedback path to unknown force estimator 208. The cyclist constraint force signal $F_C$ is also supplied, for example, to a cyclist power estimator 214, which also receives, for example, the speed of the bicycle $\omega_B$ and generates the estimated cyclist power Power$_{cyclist}$(k). In particular, it would be clear to one of ordinary skill in the art that, while a cyclist force is estimated in the described embodiments, in certain embodiments this force could be expressed in the form of a power value equal to the force multiplied by the distance over time. For example, in certain embodiments the power in watts can be obtained by the following equation:

$$\text{Power}_{Cyclist}(k) = |\tilde{F}_H \cdot v(k)|$$

where v(k) is the speed of the bicycle and $\tilde{F}_H$ is the estimated useful force of the cyclist.

As a variation, rather than being expressed in the form of a linear force, the force exerted by the cyclist could be expressed in the form of a torque. For example, the torque in Nm can be obtained by the following equation:

$$\text{Pedalling Torque}_{Cyclist}(k) = \frac{\text{Power}_{Cyclist}}{\omega_p(k)}.$$

In yet another example, the acceleration in m/s² generated by the cyclist could be obtained by the following equation:

$$\text{Acceleration}_{Cyclist}(k) = \frac{\tilde{F}_H}{M}$$

where M is the mass of the cyclist and the bicycle.

Of course, in certain embodiments the motor could be turned off so that the force of the motor $F_M$ is equal to zero.

Figure 3:
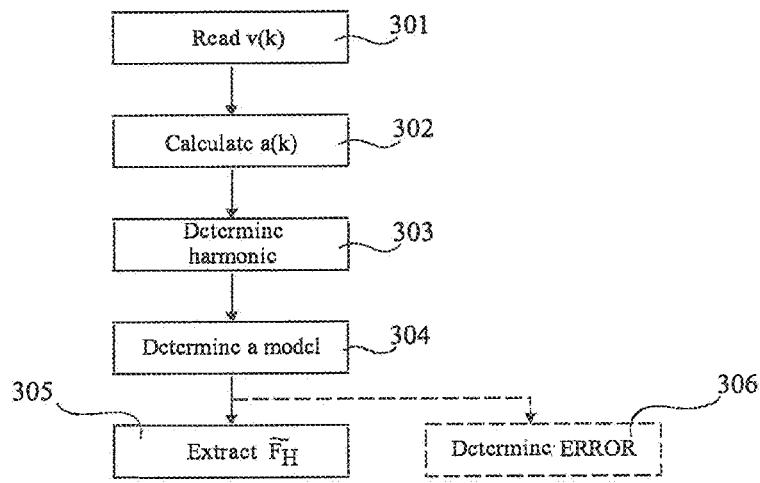
FIG. 3 is a flowchart illustrating steps in a force estimation method in a mechanical or electromechanical system according to an embodiment example.

FIG. 3 is a flowchart illustrating the steps in a method for determining the force of a cyclist on a motor-assisted bicycle, such as bicycle 100 in FIG. 1. The method is implemented, for example, by computer 106.

In step 301, a reading of speed v(k) of the bicycle is obtained, for instance. In certain embodiments, this speed can be generated based on the signal $\omega_B$ coming from a wheel speed sensor or another input. As a variation, speed v(k) can be calculated based on a reading of the motor speed $\omega_{MOTOR}$, in radians per second, and based on the radius of the motor Rm, with, for example, v(k)=$\omega_{MOTOR}$·Rm.

In step 302, an acceleration value a(k) is calculated based on the speed value, for instance by a differential calculation of the speed signal over time.

In step 303, the frequency of one or more harmonics of the acceleration signal a(t) is determined, for example. The term "harmonic" is used to refer to a fundamental frequency and/or the first, second, third, etc., harmonic frequencies. In an embodiment described in greater detail below, the harmonic frequencies are determined based on an iterative algorithm.

Figure 4:
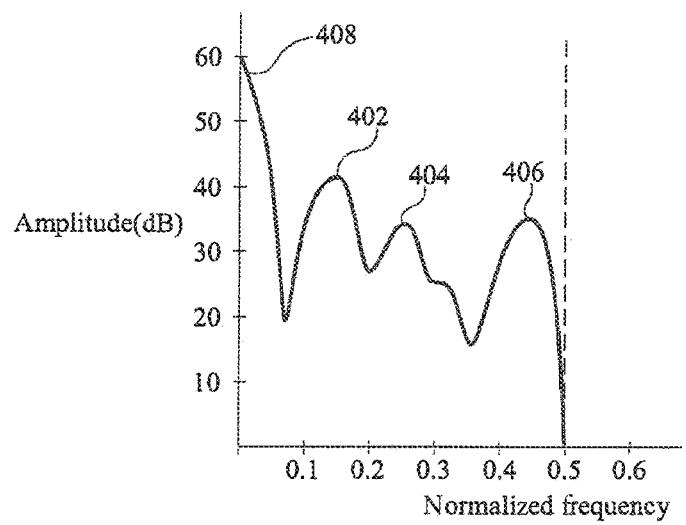
FIG. 4 is a graph showing frequency components of an acceleration signal according to an embodiment example.

FIG. 4 is a graph illustrating an example of the amplitudes of frequency components of the acceleration signal. The frequency axis shows, for example, the normalized frequency in the form of fractions of the sampling frequency 1/Ts, where Ts is the sampling period. In some embodiments, the sampling frequency is equal to 20 Hz and therefore the sampling period Ts is equal to 50 ms. More generally speaking, the sampling frequency is for instance between 10 and 50 Hz.

In the example of FIG. 4, the harmonic frequencies correspond to peaks on the frequency distribution curve labelled 402, 404, and 406, which for instance are at about 3, 5, and 9 Hz, respectively. There is also, for example, a direct current component, DC, of the acceleration signal represented by a peak 408 at 0 Hz. Step 303 in FIG. 3 involves, for example, an estimation of the frequency of one or more of harmonics 402, 404, and 406.

Referring once again to FIG. 3, in step 304 a model is generated for the forces present in the bicycle system, based on the harmonic frequencies. This model includes a force component $\tilde{F}_H$(k).

In step 305, the force component $\tilde{F}_H$(k) is extracted from the model in order to obtain the estimation of the useful force exerted by the cyclist.

In certain embodiments, another step 306 involves determining an error value associated with the estimated force $\tilde{F}_H$(k).

Figure 5:
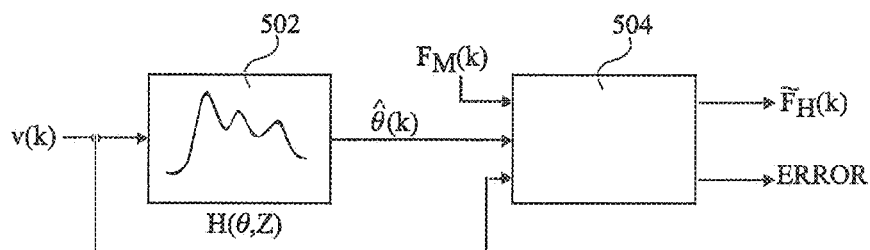
FIG. 5 is a schematic illustration of a force estimation method in a mechanical or electromechanical system according to an embodiment example.

FIG. 5 is a block diagram showing steps 302 to 305 of FIG. 3 in greater detail.

Block 502 in FIG. 5 represents the implementation of steps 302 and 303 in FIG. 3. Block 502 receives the speed value v(k) and, based on a model of a transfer function H($\hat{\theta}$,Z), calculates the harmonics $\bar{\theta}$(k) updated based on the speed value v(k).

Block 504 in FIG. 5 represents the implementation of steps 304, 305, and 306 in FIG. 3. Block 504 receives the speed value v(k), the harmonics $\bar{\theta}$(k) generated by block 502, and the force of the motor $F_M$. The force of the motor $F_M$ can be determined, for example, based on the speed constant of the motor Ke and a measurement of the current I supplied to the motor. In particular, the force of the motor $F_M$ is generated, for example, based on the motor torque $T_M$, equal to, for example, Ke*I, where Ke is the speed constant of the motor and I is the current. The force of the motor $F_M$ is therefore equal, for example, to $T_M$/Rm, where Rm is the radius of the motor, in the case of a roller motor on a tyre, such as motor 102 in FIG. 1. Block 504 generates, for example, an estimation $\tilde{F}_H$(k) of the useful force exerted by the cyclist. In certain embodiments, block 504 also generates an error value indicating the margin of error in the force estimation.

Figure 6:
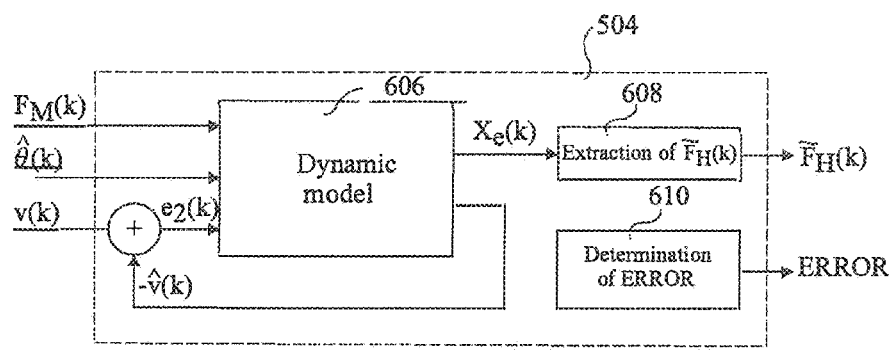
FIG. 6 is a more detailed schematic illustration of a portion of the method in FIG. 6 according to an embodiment example.

FIG. 6 illustrates block 504 of FIG. 5 in greater detail according to an embodiment example.

A dynamic model 606 receives, for example, the force of the motor $F_M(k)$, the harmonic frequencies $\overline{\theta}(k)$, and an error value $e_2(k)$ obtained by subtracting an estimation $\overline{v}(k)$ of the speed from the speed value $v(k)$. Block 606 provides, for example, an updated dynamic model $Xe(k)$. Block 608 represents the extraction of the force estimation $\tilde{F}_H(k)$ from the dynamic model $Xe(k)$. Another block 610 represents the determination of the error associated with the force estimation.

Figure 7:
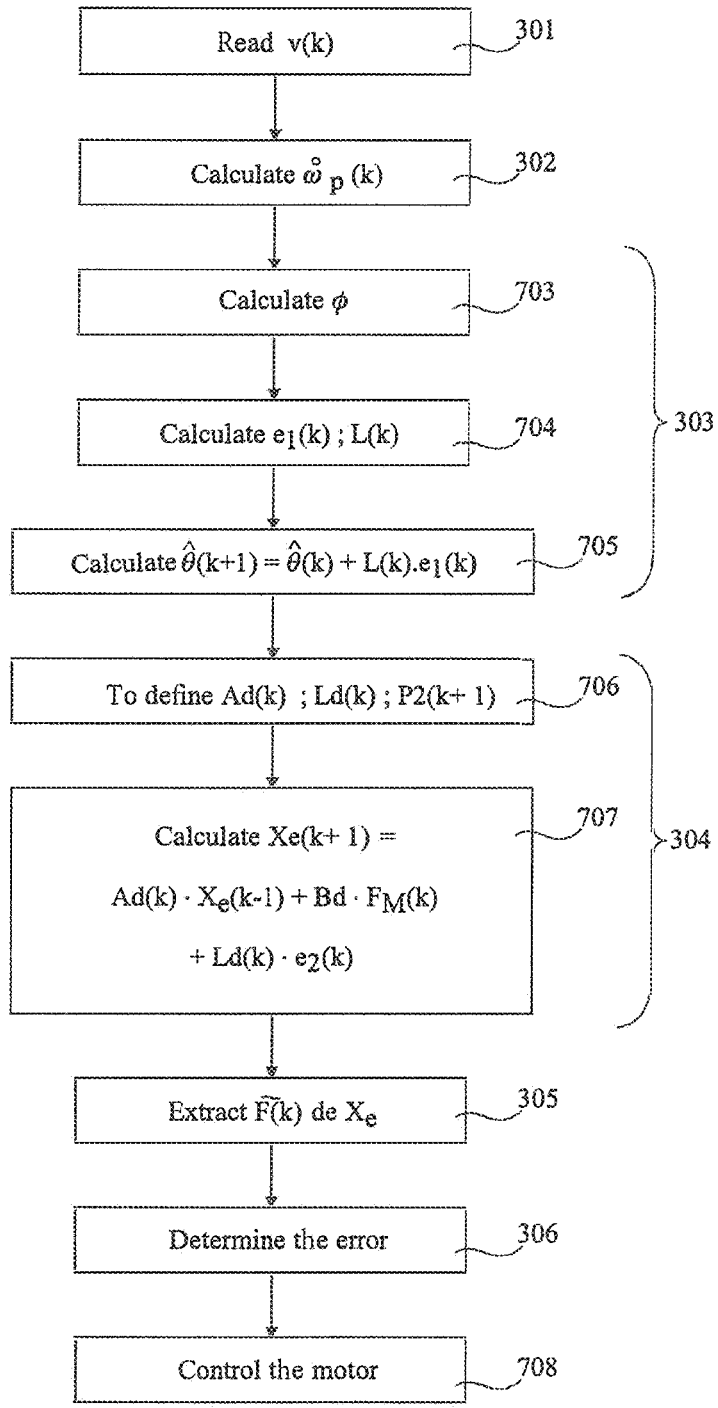
FIG. 7 is a more detailed flowchart showing the steps in the method of FIG. 3 according to an embodiment example.

FIG. 7 is a more detailed block diagram representing the method of FIG. 3 according to an embodiment example.

After step 301 in which the speed value $v(k)$ is read, step 302 involves, for example, calculation of the acceleration value $a(k)$ in the form of a value $\dot{\omega}_P(k)$ based on the pedalling speed $\omega_P(k)$. For example, the pedal acceleration value $\dot{\omega}_P(k)$ is calculated by the following equation:

$$\dot{\omega}_P(k) = \frac{(\omega_p(k) - \omega_p(k-1))}{Ts}$$

where $\omega_P(k-1)$ is a previous value of the pedal speed and $Ts$ is the sampling period, for example, equal to the time period between samples $\omega_p(k-1)$ and $\omega_p(k)$ of the pedal speed.

Of course, instead of being based on the pedal speed $\omega_p(k)$, in some other embodiments the acceleration value $a(k)$ could be calculated based on another speed signal.

Steps 703 to 705 in FIG. 7 implement step 303 of FIG. 3, which involve finding one or more harmonics of the acceleration signal.

Step 703 involves, for example, calculating a vector $\varphi$ in the form of $[r(k-1); r(k-2)]$, where $r(k-1)=\dot{\omega}_P(k-1)$ and $r(k-2)=\dot{\omega}_P(k-2)$.

Step 704 involves, for example, calculating an error value $e_1(k)$ and a parameter $L(k)$.

The error value $e_1(k)$ is, for example, based on the following formula:

$$e_1(k) = r(k) - \varphi^T \hat{\theta}(k)$$

where $r(k) = \dot{\omega}_P(k)$ and $\hat{\theta}(k)$ is, for example, a vector representing an estimation of the harmonic frequencies initialized to zero, and $\varphi^T \hat{\theta}(k)$ is an estimation of the acceleration.

The parameter $L(k)$ is, for example, based on the following formula:

$$L(k) = P(k)\varphi(\varphi^T P(k)\varphi + FF)$$

where $FF$ is a forgetting factor, for example equal to 0.95, and $P(k)$ is a matrix which is initialized, for example, to a certain value, such as a value of:

$$P(k) = \begin{pmatrix} 100 & 0 \\ 0 & 100 \end{pmatrix}$$

and is recalculated for each new iteration by the following formula:

$$P(k+1) = \left(\frac{1}{FF}\right) \cdot \left(P(k) - L(k)\varphi^T P(k)\right).$$

In step 705, a harmonic vector $\hat{\theta}(k+1)$ is generated, for example, based on the following formula:

$$\hat{\theta}(k+1) = \hat{\theta}(k) + L(k) \cdot e_1(k)$$

For example, in the case of a single harmonic, the harmonic vector $\hat{\theta}(k+1)$ has, for instance, the following form:

$$\begin{pmatrix} \hat{\theta}_1(k+1) \\ \hat{\theta}_2(k+1) \end{pmatrix}$$

where $\hat{\theta}_1$ represents the frequency of the harmonic, for example in the form $\hat{\theta}_1 = -2\cos(\omega \cdot T_S)$ where $\omega = 2\Pi f$, with $f$ being the frequency of the harmonic, and $\hat{\theta}_2$ represents the quality factor of the harmonic, which is for instance close to 1.

Step 304 involves, for example, sub-steps 706 and 707. In these steps, a dynamic model $Xe$ representing the bicycle system is modified, for example, based on the last speed value $v(k)$. For example, the dynamic model is based on the following equation for the drive force of the bicycle:

$$\text{Total Force} = M \cdot \dot{v}(t) = M\left(\frac{v(k) - v(k-1)}{Ts}\right) = F_M + \tilde{F}_H + \overline{F}$$

where $\tilde{F}_H$ represents the force exerted by the cyclist and $\overline{F}$ represents the other forces contributing to the overall force of the bicycle, such as wind, terrain, etc. Based on this equation, the next dynamic model $Xe$ can be defined, for example, as being a vector having the following components:

$$Xe = \begin{pmatrix} \hat{v}(k) \\ \hat{\overline{F}}(k) \\ \hat{\tilde{F}}_H(k) \\ \hat{z}(k) \end{pmatrix}$$

where $\tilde{F}_H(k-1)$, $\hat{v}(k)$, $\hat{\overline{F}}(k)$, $\hat{Z}(k)$ and $\hat{Z}(k)$ are defined as follows:

$$\tilde{F}_H(k-1) = F_C(k) \qquad \sim 1$$

$$\hat{v}(k) = \hat{v}(k-1) + \frac{Ts}{M} \cdot F_M(k) + \frac{Ts}{M} \cdot \hat{\overline{F}}(k-1) + \frac{Ts}{M} \cdot \hat{\tilde{F}}_H(k-1) \qquad \sim 2$$

$$\hat{\overline{F}}(k) = \hat{\overline{F}}(k-1) \qquad \sim 3$$

$$\hat{\tilde{F}}_H(k) = \hat{z}(k-1) \qquad \sim 4$$

$$\hat{z}(k) = -\hat{\theta}_2(k) \cdot \hat{\overline{F}}(k-1) - \hat{\theta}_1(k) \cdot \hat{z}(k-1) \qquad \sim 5$$

In step 706, a matrix $Ad(k)$ and vectors $Ld(k)$ and $P_2(k+1)$ are calculated, for example.

Matrix $Ad(k)$ is calculated, for example, based on the following formula:

$$Ad(k) = \begin{bmatrix} 1 & Ts/M & Ts/M & 0 \\ 0 & 1 & 0 & 0 \\ 0 & 0 & 0 & 1 \\ 0 & 0 & -\hat{\theta}_2(k) & -\hat{\theta}_1(k) \end{bmatrix}$$

where $Ts$ is the sampling period and $M$ is the mass of the bicycle and the cyclist.

Vector Ld(k) is calculated, for example, based on the following formula:

$$Ld(k)=((Cd \cdot P_2 \cdot Cd^T+Vd) \cdot Cd \cdot P_2 \cdot Ad^T)^T$$

where Cd is the vector [1 0 0 0], for example, and Vd is a constant representing the covariance expected from the speed measurements.

Vector $P_2(k+1)$ is calculated, for example, based on the following formula:

$$P_2(k+1)=Ad \cdot P_2(k) \cdot Ad^T+Wd-Ad \cdot P_2(k)Cd^TLd^T$$

where Wd is a constant matrix representing the covariance expected from the process disturbances, that is, the covariance of the exogenous forces.

In step 707, the vector Xe(k+1) is calculated, for example, based on the following formula:

$$Xe(k+1)=(Ad-Ld \cdot Cd)Xe(k)+Bd \cdot F_M(k)+Ld \cdot e_2(k)$$

where $e_2(k)$ is an error value equal to $v(k)-\hat{v}(k)$ and $\hat{v}(k)$ is an estimation of the speed $v(k)$.

In step 305, the force $\tilde{F}_H$ exerted by the cyclist is extracted, corresponding for example to the third element Xe(3) of vector Xe. In addition, the other forces $\bar{F}$ can be extracted, the forces corresponding, for example, to the second element Xe(2) of vector Xe.

Step 306 involving determining, for example, an error value ERROR_$\tilde{F}$ associated with the estimated force, as shown in block 610 in FIG. 6. The error value is determined, for example, based on the following equation for an error vector of vector Xe:

$$ERROR=\sqrt{diag(P_2(k)) \cdot e_2^2(k)}$$

The error value ERROR $\tilde{F}$ is then extracted, for example, as the third element ERROR(3) of the ERROR vector. In certain embodiments, the amplitude of the error value ERROR $\tilde{F}$ is then compared to an admissible level to decide whether the force estimation is sufficiently accurate to be useful. For example, the following operation is implemented:

If $|ERROR_{\tilde{F}}| \varepsilon$ Then Force Estimation is "admissible," Otherwise "not admissible"

where ε is the admissible level, for example equal to a value of between 2 and 10 percent, and in certain embodiments between 2 and 5 percent.

Optionally, in step 708 the motor of the bicycle is controlled based on the estimated force if, for example, the estimated force is determined in step 306 to be admissible.

Figure 8A:
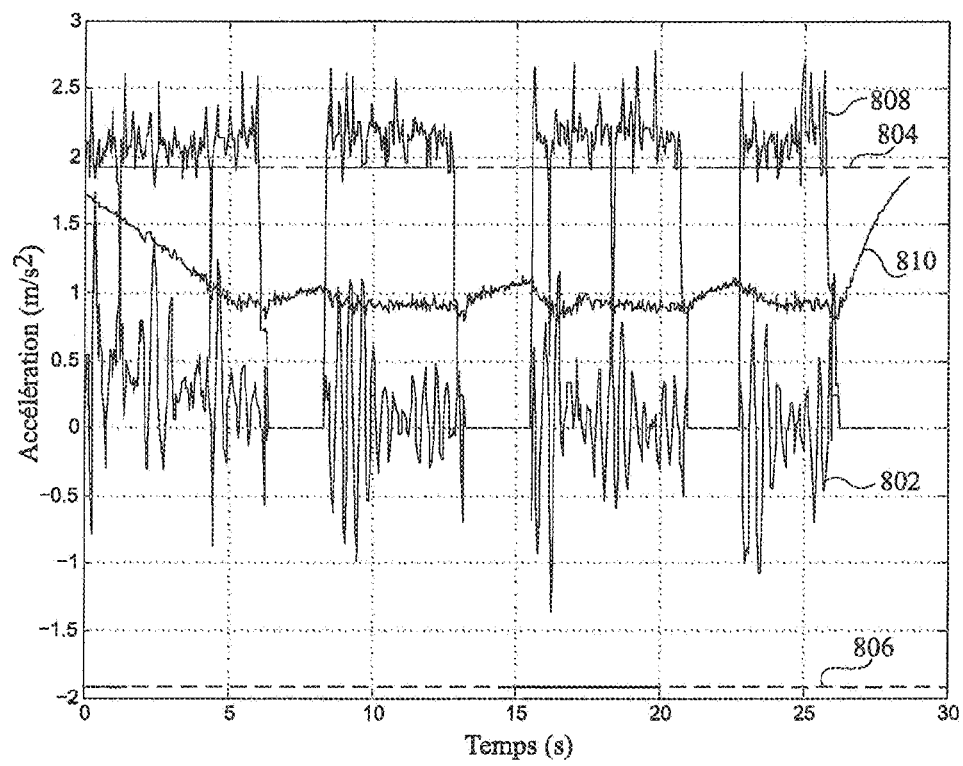
FIG. 8A is a graph illustrating an acceleration signal and a resultant force according to an embodiment example.

FIG. 8A is a graph including a curve 802 representing an example of estimated acceleration produced by the cyclist before the constraints are considered. Dashed lines 804 and 806 represent the maximum and minimum accelerations, respectively, due to gravity, assuming a maximum road slope of 20 percent. Curves 808 and 810 represent other constraints, calculated for example in real time by module 212 in FIG. 2. In particular, curve 808 represents the maximum acceleration generated by the weight of the cyclist on the pedals, with this signal dropping for example to zero during periods when the cyclist stops pedalling. Curve 810 represents, for example, the maximum acceleration in the presence of aerodynamic losses.

FIG. 8B is another graph illustrating constraints 804, 806, 808, and 810 of FIG. 8A, and also illustrating a curve 812 representing the constraint force $F_C$ after the constraints have been taken into account. In particular, curves 804, 808, and 810 represent maximum constraint values Cmax(t), whereas curve 806 represents a minimum constraint value Cmin(t).

The constraint force $F_C$ is, for example, equal to the estimated unconstrained force of the cyclist F if none of the constraints is exceeded, for example, since Cmin(t)<=F<=Cmax (t). As a variation, if F<Cmin(t), FQ is for example equal to Cmin(t), and if F>Cmax(t), then FQ is for example equal to Cmax(t).

FIG. 9 is a schematic illustration of a computer 900 configured to implement the method of FIG. 3 and/or of FIG. 7 in order to calculate a cyclist force, and which corresponds, for example, to computer 106 in FIG. 1.

Computer 900 includes, for example, a processing device (P) 902 including one or more processors under the control of instructions stored in instruction memory 904. An input interface (I/O INTERFACE) 906 makes it possible, for example, to enter readings into processing device 902 coming from various measurement devices, such as those coming from, for example, the electric motor and/or a separate speed sensor. Memory 908, for example, stores the various parameters, vectors, and matrices described earlier for implementation of the method.

Instead of being used to calculate an estimation of the force exerted by a cyclist, in some other embodiments the methods of FIGS. 3 and 7 and the device of FIG. 9 could be applied to estimate the force exerted by the wind on the blades of a wind turbine, as will now be described in greater detail in reference to FIG. 10.

FIG. 10 illustrates an example of a wind turbine 1000 including two or more blades 1002 connected to a shaft 1004, which is in turn connected to an electrical power generator 1006.

Of equations 1 through 5 indicated earlier and representing the dynamic model of forces on the bicycle, equations 1, 2, and 5 remain unchanged, for example, while equations 2 and 3 are replaced, for example, with the following equations 1', 2', and 3':

$$\hat{\omega}_T(k) = \hat{\omega}_T(k-1) - \left(\frac{Ts}{I}\right)\tau_{generator}(k) + \left(\frac{Ts}{I}\right)\left(\hat{\tau}_{wind} + \hat{\tilde{\tau}}_{wind}\right) \quad \sim 1'$$

$$\hat{\tau}_{wind}(k) = \hat{\tau}_{wind} \quad \sim 2'$$

$$\hat{\tilde{\tau}}_{wind}(k) = \hat{z}(k-1) \quad \sim 3'$$

where $\omega_T$ is the speed of the turbine and $\hat{\omega}_T(k)$ is an estimation of the speed of the turbine, Ts is the sampling period, I is the inertia of the turbine, $\tau_{generator}$ is the torque applied by the generator, equal for example to $Ke \cdot I_{generator}$, where Ke is the constant speed of the motor and $I_{generator}$ is the current generated by the generator, and $\hat{\tau}_{wind}+\hat{\tilde{\tau}}_{wind}$ represents the total torque generated by the wind, with $\hat{\tilde{\tau}}_{wind}$ representing a cyclical component of this torque. The speed of the turbine $\omega_T$ is for example detected by a speed sensor located on the main shaft of the turbine and/or using a generator speed measurement based, for example, on rotation encoders.

The speed of the generator depends both on the torque produced by the wind and the torque produced by the generator, which is proportional to the electrical current $I_{generator}$ drawn from the generator. In certain embodiments, the estimation of the torque $\tau_{wind}$ produced by the wind can be used to control the speed of the generator by controlling the current level $I_{generator}$. One advantage in controlling the torque of the generator in this way is that cyclical fluctuations in the speed of blades 1002 can be avoided, thus avoiding or reducing the risk of damage to the turbine.

One advantage of the embodiments described here is that a periodic or substantially periodic force in a mechanical or electromechanical system can be estimated practically in real time and with relatively high precision in a relatively easy way.

A description of a sample embodiment having now been given, various alterations, modifications, and improvements or enhancements will become readily clear to one of ordinary skill in the art. For instance, although a particular example of a dynamic model is given in the aforementioned equations 1 through 5, it will be clear to one of ordinary skill in the art that modifications could be made to these equations to take into account, for instance, additional forces present in the system, and that the equations could be adapted to applications other than the examples of a bicycle and wind turbine described herein.

The invention claimed is:

1. A method for estimating a periodic or substantially periodic force present in a mechanical or electromechanical system, the method comprising:

estimating one or more harmonic frequencies of an acceleration signal in the system using a processing device, with the substantially periodic force contributing to the acceleration; and using the processing device, estimating the force based on a dynamic model of the system, the dynamic model being defined by the one or more estimated harmonic frequencies, wherein the mechanical or electromechanical system is a motor-assisted bicycle and the periodic or substantially periodic force is the pedalling force generated by the cyclist, and in which the dynamic model includes one or more of estimations $\hat{v}(k)$, $\hat{\bar{F}}(k)$, $\hat{\tilde{F}}_H(k)$ and $\hat{Z}(k)$, in which each of these estimations is defined as follows:

$$\hat{v}(k) = \hat{v}(k-1) + \frac{Ts}{M} \cdot F_M(k) + \frac{Ts}{M} \cdot \hat{\bar{F}}(k-1) + \frac{Ts}{M} \cdot \hat{\tilde{F}}_H(k-1)$$

$$\hat{\bar{F}}(k) = \hat{\bar{F}}(k-1)$$

$$\hat{\tilde{F}}_H(k) = \hat{z}(k-1)$$

$$\hat{z}(k) = -\hat{\theta}_2(k) \cdot \hat{\bar{F}}(k-1) - \hat{\theta}_1(k) \cdot \hat{z}(k-1)$$

where Ts is the sampling period, M is the mass of the cyclist and the bicycle, FM is the force (k) generated by the motor, and $\hat{\theta}_1(k)$ and $\hat{\theta}_2(k)$ represent one of the harmonic frequencies, $\hat{\tilde{F}}_H(k-1)$ is the estimation of the force exerted by the cyclist, and $\hat{\bar{F}}(k-1)$ is an estimation of other forces in the system.

2. The method according to claim 1, wherein the dynamic model is updated based on an error signal (e2($k$)) representing the difference between a sensed speed signal (v(k)) and an estimated speed signal ($\hat{v}$(k)).

3. The method according to claim 1, further including the generation of an acceleration signal based on a differential calculation over time for two or more values of a speed signal representing an angular or linear speed in the system.

4. The method according to claim 1, wherein the estimation of the one or more harmonic frequencies of the acceleration signal involves the calculation of an error signal equal to:

$$e_1(k) = r(k) - \varphi^T \hat{\theta}(k)$$

where r(k) is a current acceleration value and $\varphi^T \hat{\theta}(k)$ is an estimation of the acceleration based on a vector $\hat{\theta}(k)$ representing the harmonic frequencies and a vector y representing one or more previous acceleration values.

5. The method according to claim 1, wherein the mechanical or electromechanical system is a wind turbine and the periodic or substantially periodic force is a periodic component of the force of the wind on the blades of the wind turbine, and in which the dynamic model includes one or more of estimations $\hat{\omega}_T(k)$, $\hat{\bar{F}}_H(k)$, $\hat{\tilde{F}}_H(k)$ and $\hat{Z}(k)$, in which each of these estimations is defined as follows:

$$\hat{\omega}_T(k) = \hat{\omega}_T(k-1) - \left(\frac{Ts}{I}\right)\tau_{generator}(k) + \left(\frac{Ts}{I}\right)\left(\hat{\bar{\tau}}_{wind} + \hat{\tilde{\tau}}_{wind}\right)$$

$$\hat{\bar{F}}(k) = \hat{\bar{F}}(k-1)$$

$$\hat{\tilde{F}}_H(k) = \hat{z}(k-1)$$

$$\hat{z}(k) = -\hat{\theta}_2(k) \cdot \hat{\bar{F}}(k-1) - \hat{\theta}_1(k) \cdot \hat{z}(k-1)$$

where Ts is the sampling period, $\hat{\theta}_1(k)$ and $\hat{\theta}_2(k)$ represent one of the harmonic frequencies, $\hat{\tilde{F}}_H(k-1)$ is the estimation of the force exerted by the wind, and $\hat{\bar{F}}(k-1)$ is an estimation of other forces in the system, where ωτ is the speed of the turbine and $\hat{\omega}_T(k)$ is an estimation of the speed of the turbine, I is the inertia of the turbine, $\tau_{generator}$ is the torque applied by the generator, for example equal to Ke·$I_{generator}$, where Ke is the speed constant of the motor and $I_{generator}$ is the current generated by the generator, and $\hat{\bar{\tau}}_{wind} + \hat{\tilde{\tau}}_{wind}$ represents the total torque generated by the wind, with $\hat{\tilde{\tau}}_{wind}$ representing a cyclical component of this torque.

6. The method according to claim 1, wherein one or more harmonic frequencies include at least one from among the fundamental frequency, the first harmonic frequency, the second harmonic frequency, and the third harmonic frequency.

7. A method for estimating a periodic or substantially periodic force present in a mechanical or electromechanical system, the method comprising:

estimating one or more harmonic frequencies of an acceleration signal in the system using a processing device, with the substantially periodic force contributing to the acceleration; and using the processing device, estimating the force based on a dynamic model of the system, the dynamic model being defined by the one or more estimated harmonic frequencies, wherein the mechanical or electromechanical system is a wind turbine and the periodic or substantially periodic force is a periodic component of the force of the wind on the blades of the wind turbine, and in which the dynamic model includes one or more of estimations $\hat{\omega}_T(k)$, $\hat{\bar{F}}_H(k)$, $\hat{\tilde{F}}_H(k)$ and $\hat{Z}(k)$, in which each of these estimations is defined as follows:

$$\hat{\omega}_T(k) = \hat{\omega}_T(k-1) - \left(\frac{Ts}{I}\right)\tau_{generator}(k) + \left(\frac{Ts}{I}\right)\left(\hat{\bar{\tau}}_{wind} + \hat{\tilde{\tau}}_{wind}\right)$$

$$\hat{\bar{F}}(k) = \hat{\bar{F}}(k-1)$$

$$\hat{\tilde{F}}_H(k) = \hat{z}(k-1)$$

$$\hat{z}(k) = -\hat{\theta}_2(k) \cdot \hat{\bar{F}}(k-1) - \hat{\theta}_1(k) \cdot \hat{z}(k-1)$$

where Ts is the sampling period, $\hat{\theta}_1(k)$ and $\hat{\theta}_2(k)$ represent one of the harmonic frequencies, $\tilde{F}_H(k-1)$ is the estimation of the force exerted by the wind, and $\overline{F}(k-1)$
is an estimation of other forces in the system, where $\omega\tau$ is the speed of the turbine and $\hat{\omega}_T(k)$ is an estimation of the speed of the turbine, I is the inertia of the turbine, $\tau_{generator}$ is the torque applied by the generator, for example equal to $Ke \cdot I_{generator}$, where Ke is the speed constant of the motor and $I_{generator}$ is the current generated by the generator, and $\tilde{\tau}_{wind} + \hat{\tilde{\tau}}_{wind}$ represents the total torque generated by the wind, with $\tilde{\tau}_{wind}$ representing a cyclical component of this torque.

* * * * *